US012633542B2

(12) United States Patent
Katou et al.

(10) Patent No.: US 12,633,542 B2
(45) Date of Patent: May 19, 2026

(54) ELECTRODE AND METHOD FOR PRODUCING ELECTRODE

(71) Applicant: Panasonic Intellectual Property Management Co., Ltd., Osaka (JP)

(72) Inventors: Daisuke Katou, Kyoto (JP); Reiko Izumi, Osaka (JP); Takuya Jin, Osaka (JP); Shinichiro Kondo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 550 days.

(21) Appl. No.: 18/027,545

(22) PCT Filed: Jul. 7, 2021

(86) PCT No.: PCT/JP2021/025572
§ 371 (c)(1),
(2) Date: Mar. 21, 2023

(87) PCT Pub. No.: WO2022/070542
PCT Pub. Date: Apr. 7, 2022

(65) Prior Publication Data
US 2023/0378468 A1      Nov. 23, 2023

(30) Foreign Application Priority Data
Sep. 30, 2020      (JP) ................................. 2020-165211

(51) Int. Cl.
H01M 4/62 (2006.01)
H01M 4/04 (2006.01)
(Continued)

(52) U.S. Cl.
CPC ......... H01M 4/623 (2013.01); H01M 4/0435 (2013.01); H01M 4/133 (2013.01); H01M 10/0525 (2013.01); H01M 2004/021 (2013.01)

(58) Field of Classification Search
None
See application file for complete search history.

(56) References Cited

U.S. PATENT DOCUMENTS

| | | |
|---|---|---|
| 2009/0191460 A1 | 7/2009 | Fujiwara et al. |
| 2013/0295463 A1 | 11/2013 | Matsuda et al. |
| (Continued) | | |

FOREIGN PATENT DOCUMENTS

| | | |
|---|---|---|
| JP | 2008-166155 A | 7/2008 |
| JP | 2009-206079 A | 9/2009 |
| (Continued) | | |

OTHER PUBLICATIONS

Extended (Supplementary) European Search Report dated Jun. 18, 2024, issued in counterpart Application No. 21874846.5. (15 pages).
(Continued)

*Primary Examiner* — Wyatt P McConnell
(74) *Attorney, Agent, or Firm* — WHDA, LLP

(57) ABSTRACT

With respect to this electrode, the coverage of the surface of a coated active material by a conductive material is from 10% to 60%; the mixture resistance of a electrode mixture material is 20 Ωcm or less in cases where the electrode mixture material is divided into three equal parts in the thickness direction, namely into a first region, a second region and a third region from a core material side, the content (a) of a PTFE powder in the first region, the content (b) of the PTFE powder in the second region and the content (c) of the PTFE powder in the third region satisfy $-10\% \leq (c-a)/(a+b+c) \leq 10\%$.

11 Claims, 2 Drawing Sheets

(51) Int. Cl.
| | |
|---|---|
| _H01M 4/133_ | (2010.01) |
| _H01M 10/0525_ | (2010.01) |
| _H01M 4/02_ | (2006.01) |

(56) References Cited

U.S. PATENT DOCUMENTS

| | | | |
|---|---|---|---|
| 2017/0256367 A1 | 9/2017 | Raman et al. | |
| 2021/0249657 A1 | 8/2021 | Shin et al. | |
| 2022/0006071 A1* | 1/2022 | Petrowsky | H01M 50/414 |
| 2022/0293952 A1 | 9/2022 | Brown | |
| 2022/0359869 A1* | 11/2022 | Kim | H01M 10/052 |

FOREIGN PATENT DOCUMENTS

| | | | |
|---|---|---|---|
| JP | 2015-183154 A | 10/2015 |
| JP | 2019-512872 A | 5/2019 |
| JP | 2019-91525 A | 6/2019 |
| KR | 10-2019-0124038 A | 11/2019 |
| WO | 2012/098970 A1 | 7/2012 |
| WO | 2019/213068 A1 | 11/2019 |
| WO | 2021/028619 A1 | 2/2021 |

OTHER PUBLICATIONS

International Search Report dated Aug. 31, 2021, issued in counterpart International Application No. PCT/JP2021/025572 (2 pages).

* cited by examiner

Figure 1
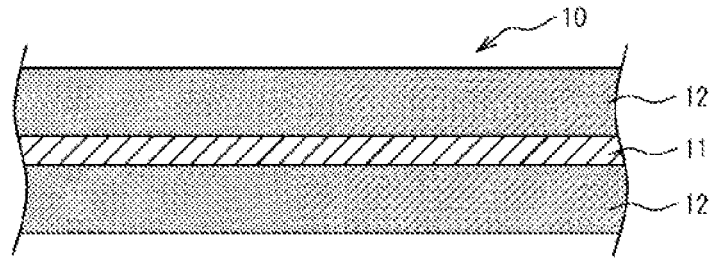
Figure 2
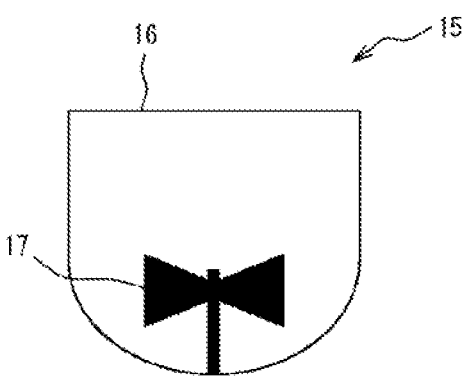
Figure 3(a)     Figure 3(b)

ELECTRODE AND METHOD FOR PRODUCING ELECTRODE

CROSS-REFERENCE TO RELATED APPLICATION

This application is a National Phase Application filed under 35 U.S.C. § 371 of International Application No. PCT/JP2021/025572 filed on Jul. 7, 2021 which claims the benefit of priority under 35 U.S.C. § 119(a) of Japanese Patent Application No. 2020-165211 filed in Japan on Sep. 30, 2020, the contents of which are incorporated herein by reference.

TECHNICAL FIELD

The present disclosure generally relates to an electrode and a method for manufacturing an electrode.

BACKGROUND ART

An electrode of a non-aqueous electrolyte secondary battery such as a lithium-ion battery is typically manufactured by a wet method in which an electrode mixture slurry including an active material, a binder, and the like is applied onto a surface of a core being a metal foil, and the coating film is dried and compressed. In this case, there is a problem that migration, the travelling of the binder during drying of the coating film, easily occurs. Such binder migration increases the amount of the binder on the surface side compared with the core side of the coating film (electrode mixture layer), leading to uneven distribution of the binder in the thickness direction of the electrode mixture layer.

Investigated in recent years is a dry method including forming a sheet by rolling an electrode mixture to produce an electrode mixture sheet, and laminating the sheet onto a core to manufacture an electrode. Patent Literature 1 discloses an electrode film (electrode mixture) produced by mixing an active material, a particle binder, and a conductive agent using a mill and applying a large shear force to this mixture at a high pressure for treatment for a long time to fibrillate the binder.

CITATION LIST

Patent Literature

PATENT LITERATURE 1: National Publication of International Patent Application No. 2019-512872

SUMMARY

The present inventors have made investigation and consequently found that applying a large shear force to the electrode mixture for treatment for a long time, as disclosed in Patent Literature 1, causes the conductive agent to adhere not to the active material but to the binder to considerably decrease a mixture resistance, resulting in decreased discharge capacity of the battery.

An electrode according to an aspect of the present disclosure is an electrode comprising an electrode mixture laminated onto a surface of a core, the electrode mixture including: a coated active material in which a conductive agent is adhered onto a surface of an active material; and a PTFE powder, wherein a coverage of the conductive agent on a surface of the coated active material is 10% to 60%, a mixture resistance of the electrode mixture is 20 $\Omega$cm or less, and when the electrode mixture is trisected in a thickness direction to specify first region, a second region, and a third region from a side of the core, a content (a) of the PTFE powder in the first region, a content (b) of the PTFE powder in the second region, and a content (c) of the PTFE powder in the third region satisfy $-10\% \leq (c-a)/(a+b+c) \leq 10\%$.

A method for manufacturing an electrode according to an aspect of the present disclosure includes: a mixing step of mixing a coated active material in which a conductive agent is adhered onto a surface of an active material and a PTFE powder to produce electrode mixture particles having a solid-content concentration of substantially 100%; a rolling step of rolling the electrode mixture particles for forming a sheet to produce an electrode mixture sheet; and a laminating step of laminating the electrode mixture sheet onto a core to produce an electrode.

According to an aspect of the present invention, an electrode having a low mixture resistance can be obtained and a discharge capacity of the battery can be increased.

BRIEF DESCRIPTION OF DRAWINGS

FIG. 1 is a sectional view of an electrode of an example of an embodiment.

FIG. 2 is a view illustrating an overview of a mechanofusion reactor, which is an apparatus for producing a coated active material of an example of an embodiment.

FIG. 3(a) is a view illustrating a mixing step in a step of manufacturing an electrode of an example of an embodiment. FIG. 3(b) is a view illustrating a rolling step.

DESCRIPTION OF EMBODIMENTS

Figure 4:
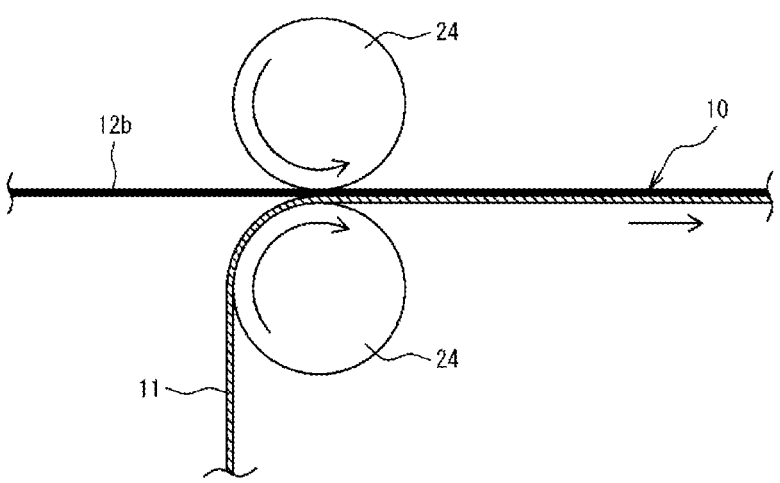
FIG. 4 is a view illustrating a laminating step in a step of manufacturing an electrode of an example of an embodiment.

Hereinafter, embodiments of an electrode and method for manufacturing an electrode according to the present disclose will be described in detail. The embodiment described below is merely an example, and the present disclosure is not limited to the following embodiments. The drawings referred in the description of the embodiments are schematically illustrated, and a size ratio and the like of constituents drawn in the drawings should be determined with considering the following description.

[Electrode]

Although being suitable for a non-aqueous electrolyte secondary battery such as a lithium-ion battery, the electrode according to the present disclosure can also be applied for a battery including an aqueous electrolyte or a storage device such as a capacitor. Hereinafter, the electrode will be described with an electrode for a non-aqueous electrolyte secondary battery (particularly when applied for a positive electrode) as an example.

FIG. 1 is a sectional view of the electrode of an example of an embodiment. An electrode 10 comprises a core 11 and an electrode mixture 12 provided on a surface of the core 11. As illustrated in FIG. 1, the electrode 10 may comprise the electrode mixtures 12 on both the surfaces of the core 11. The electrode 10 may be a long electrode constituting a wound electrode assembly, and may be a rectangular electrode constituting a stacked electrode assembly. The electrode 10 may be applied for a positive electrode, negative electrode, and both the electrodes of the non-aqueous electrolyte secondary battery.

For the core 11, a metal foil, a film in which a metal layer is formed on a surface thereof, and the like may be used. A thickness of the core 11 is, for example, 5 μm to 20 μm. In a case of the positive electrode, metal foil composed of aluminum as a Main component may be used for the core 11. In a case of the negative electrode, metal foil composed of copper as a main component may be used. The main component herein means a constituent component with the highest mass ratio. The core 11 may be aluminum foil with substantially 100% aluminum, and may be copper foil With substantially 100% copper.

The electrode mixture 12 includes a coated active material and a PTFE powder. A thickness of the electrode mixture 12 is, for example, 30 μm to 120 μm, and preferably 50 μm to 100 μm. The electrode mixture 12 may include, in addition to the PTFE powder, a binder that is not to be fibrillated, such as polvinylidene fluoride (PVdF).

The coated active material is an active material in which a conductive agent is adhered onto a surface thereof. A coverage of the conductive agent on the surface of the coated active material is preferably 10% to 60%, and more preferably 20% to 60%. Since the coverage of the conductive agent is sufficiently high, the battery characteristics of the electrode may be improved. The coated active material has roughness on the surface, and the conductive agent preferably adheres by entering a concavity of this roughness. This may enable the conductive agent on the surface of the coated active material to be hardly removed by the PTFE powder during a step of mixing the coated active material and the PTFE powder, described later. As described later, the treatment time of mixing the PTFE powder and the active material and the conductive agent may be relatively shortened to increase the ecoverage of the conductive agent. With the mixing treatment in such a short time, an increase or decrease in the conductive agent before and after the mixing treatment is ±5% or less.

The coated active material may be produced by dry-mixing the active material and the conductive agent. As the dry-mixing method, a meehano-fusion method may be used, for example. The mechano-fusion method is a dry-treatment method performed with a mechano-fusion reactor 15 comprising a blade 17 inside thereof and having a tubular chamber 16 rotating at a high speed, as illustrated in FIG. 2. The rotating speed is typically higher than 1000 rpm. The conductive agent and the active material are fed into the chamber 16, and the chamber 16 rotates to allow the particles to be pressed with each other and with a wall of the chamber 16. Using the blade 17 and generating a centrifugal force with the high-speed rotation enhance the adhering and bonding between the conductive agent and the active material. Examples of the mechano-fusion reactor 15 include: "Nobilta"® crusher and "MECHANO FUSION"® crusher, manufactured by HOSOKAWA MICRON CORPORATION (Japan): "Hybridizer"® crusher, manufactured by NARA MACHINERY CO., LTD.; "BALANCE GRAN", manufactured by FREUND-TURBO CORPORATION; and "COMPOST", manufactured by NIPPON COKE & ENGINEERING CO., LTD.

For An Active material of the positive electrode (positive electrode active material), lithium-transition metal composite oxide is typically used. Examples of the metal element contained in the lithium-transition metal composite oxide include Ni, Co, Mn, Al, B, Mg, Ti, V, Cr, Fe, Cu, Zn, Ga, Sr, Zr, Nb, In, Sn, Ta, and W. Among them, at least one of Ni, Co, and Mn is preferably contained. For an active material of the negative electrode (negative electrode active material), carbon-based active materials such as: a natural graphite such as flake graphite, massive graphite, and amorphous graphite; and an artificial graphite such as massive artificial graphite (MAG) and graphitized mesophase-carbon microbead (MCMB) are used, for example. For the negative electrode active material, a Si-based material that forms an alloy with lithium may be used. The active material is a main component of the electrode mixture 12. A content ratio of the active material in the electrode mixture 12 is preferably 85 mass % to 99 mass %, and more preferably 90 mass % to 99 mass %.

The positive electrode active material is, for example, of secondary particles formed by aggregation of a plurality of primary particles. This allows the surface of the positive electrode active material to have roughness, and as described above, the conductive agent may enter a concavity of this roughness to adhere. A particle diameter of the primary particles constituting the secondary particles is, for example, 0.05 μm to 1 μm. The particle diameter of the primary particles is measured as a diameter of a circumscribed circle in a particle image observed with a scanning electron microscope (SEM). The positive electrode active material is of particles having a median diameter (D50) on a volumetric basis of, for example, 3 μm to 30 μm, preferably 5 μm to 25 μm, and particularly preferably 7 μm to 15 μm. The D50, also referred to as a median diameter, means a particle diameter at which a cumulative frequency is 50% from a smaller particle diameter side in a particle size distribution on a volumetric basis. The particle size distribution of the positive electrode active material may be measured by using a laser diffraction-type particle size distribution measuring device (for example, MT3000II, manufactured by MicrotracBEL Corp.) with water as a dispersion medium.

Examples of the conductive agent included in the electrode mixture 12 include, carbon materials such as carbon black (CB), acetylene black (AB), Ketjenblack, carbon nanotube (CNT), and Graphite. A particle diameter of the conductive agent is, for example, 0.01 μm to 0.1 μm. This allows the conductive agent to enter and adhere to the concavity on the surface of the positive electrode active material. A content ratio of the conductive agent in the electrode mixture 12 is, for example, 0.5 mass % to 5.0 mass %.

The PTFE powder is included in the electrode mixture 12 as a binder. The PTFE powder is a dry powder, not a powder dispersed in, for example, water. According to this PTFE powder, the electrode mixture may be produced by a dry method, described later.

A content ratio of the PTFE powder in the electrode mixture 12 is, for example, 0.5 mass % to 5.0 mass %. The PTFE powder adheres to the particle surface of the coated active material to intertwine with the coated active material. In other words, the PTFE powder present in a net-shape holds the coated active material.

As an example of an embodiment, the PTFE powder includes fibrous particles having an aspect ratio of 1.5 or more at a proportion of 20% to 60% based on all the particles. An average major axis size of the fibrous particles is 1 μm to 20 μm (hereinafter, the fibrous particle having this shape is referred to as the fibrous particle A). Using this PTFE powder may produce an electrode mixture sheet having good formability and high rupture strength. A proportion of the fibrous particle A based on all the particles may be calculated as follows. A proportion of a fibrous particle B, described later, based on all the particles may also calculated as the same manner.

(1) The PTFE powder including the fibrous particle A is photographed with a scanning electron microscope (SEM). The photograph magnification may be, for example, 300 to 1000.

(2) The photographed image is imported into a computer, and all the particles are separated into the fibrous particle A and particles having an aspect ratio of less than 1.5 with an image analysis software such as ImageJ.

(3) A number of the fibrous particle A is divided by a number of all the particles, that is, a total number of the fibrous particle A and the particles having an aspect ratio of less than 1.5, to calculate the proportion of the fibrous particle A based on all the particles.

The average major axis size of the fibrous particle A may be calculated by analyzing an SEM image with an image analysis software, measuring major axis sizes (major axis lengths) of 100 fibrous particles having an aspect ratio of 1.5 or more, and averaging the measurement values. This calculation is similar to the aforementioned calculation of the proportion of the fibrous particle A based on all the particles. An average minor axis size of a fibrous particle B, described later, may also be measured in the same manner.

An average aspect ratio of the fibrous particle A may be 2 to 20. The average aspect ratio of the fibrous particle A may be calculated by analyzing an SEM image with an image analysis software, measuring aspect ratios (major axis/minor axis) of 100 fibrous particles having an aspect ratio of 1.5 or more, and averaging the measurement values. This calculation is similar to the aforementioned calculation of the average major axis size. An average aspect ratio of a fibrous particle B, described later, may also be measured in the same manner.

The PTFE powder including the fibrous particle A may be produced by fibrillating PTFE raw material (PTFE particles) belonging to a fiber-formable fine powder with a dry crusher such as a jet mill crusher. The PTFE raw material may be of secondary particles. An average particle diameter of the PTFE raw material is, for example, 100 μm to 700 μm, preferably 100 μm to 500 μm, and more preferably 100 μm to 400 μm. The at particle diameter of the PTFE raw material May be determined by observing particles of the PTFE raw material with an SEM. Specifically, outer shapes of 100 randomly selected particles are specified to determine each major diameter (longest diameter) of the 100 particles, and an average value thereof is specified as the average particle diameter of the PTFE raw material. When the PTFE powder including the fibrous particle A is produced with a jet mill crusher, appropriately regulating a supplying rate and crushing pressure of the PTFE raw material, and the like may regulate the proportion of the fibrous particle A based on all the particles within 70% to 60%.

As another example of an embodiment, the PTFE powder includes fibrous particles having an aspect ratio of 5 or more at a proportion of 60% or more based on all the particles. The PTFE powder preferably includes the fibrous particles having an aspect ratio of 5 or more at a proportion of 80% or more based on all the particles. An average minor axis size of the fibrous particle is 1 μm to 20 μm (hereinafter, the fibrous particle having this shape is referred to as the fibrous particle B). Using this PTFE powder may produce an electrode mixture sheet having good formability and high rupture strength.

The PTFE powder including the fibrous particle B may be produced by fibrillating a PTFE raw material (PTFE particles) belonging to a fiber-formable fine powder with a dry crasher such as an airflow crusher. The same PTFE raw material as in the case of producing the PTFE powder including the fibrous particle A may be used. When the PTFE powder including the fibrous particle B is produced with an airflow crusher, appropriately regulating a supplying rate of the PTFE raw material, a number of rotation of the blade, the gap, and the like may regulate the proportion of the fibrous particle B based on all the particles to 60% or more.

A median diameter of the PTFE powder including the fibrous particle A and/or B is preferably 2 μm to 20 μm. The median diameter can be measured with a particle size distribution analyzer. The median diameter of PTFE powder including the fibrous particle A and or B being 2 μm to 20 μm means that the PTFE powder including the fibrous particle A and/or B has a finer size than the PTFE particles of the PTFE raw material.

A mixture resistance of the electrode mixture 12 is 20 Ωcm or less. This may increase the discharge capacity of the battery. The mixture resistance is a resistance of only the electrode mixture 12. The mixture resistance may be measured as follows by using, for example, an electrode resistance measurement system manufactured by HIOKI E.E. CORPORATION.

(1) The electrode 10 cut to a size with 20 mm×50 mm is prepared.

(2) A thickness of the electrode mixture 12 and a thickness of the core 11 are measured to input to a measurement condition as a measurement parameter.

(3) Appropriate main current and voltage range are selected.

(4) The electrode 10 is set at a predetermined position, and a probe is contacted therewith to measure a mixture resistance.

When the electrode mixture 12 is trisected in the thickens direction to specify a first region, a second region, and a third region from a side of the core 11, a content (a) of the PTFE powder in the first region, a content (b) of the PTFE powder in the second region, and a content (c) of the PTFE powder in the third region satisfy $-10\% \le (c-a)/(a+b+c) \le 10\%$, and more preferably satisfy $-5\% \le (c-a)/(a+b+c) \le 5\%$. That is, a difference between: the content (a) of the PTFE powder in the first region, near the surface; and the content (c) of the PTFE powder in the third region, near the core 11, being within a range of ±10%, preferably within a range of ±5%, based on all the contents of the PTFE powder (a+b+c) allows the PTFE powder to be substantially uniformly present in the entire electrode mixture 12 without unevenly presence in a part thereof.

The electrode mixture 12 is preferably a mixture in which the coated active material and the PTFE powder are uniformly dispersed. The electrode mixture 12 preferably has little cracking of the active material particles, and much conductive agent adheres onto the particle surface of the active material to form a conductive path between the particles. That is, the electrode mixture 12 is required to be produced so that the cracking of the active material particles is inhibited and that the amount of the conductive agent adhering to the particle surface of the active material is not decreased by incorporating the conductive agent into the PTFE powder. According to a manufacturing method, described later, the electrode mixture 12 having good quality for satisfying such a condition can be produced.

[Method for Manufacturing Electrode]

Hereinafter, a method for manufacturing the electrode 10 will be described in more detail. Although a method for manufacturing a positive electrode will be exemplified below, this manufacturing method may also be similarly applied for manufacturing negative electrode. In a case of the negative electrode, a negative electrode active material is used instead of a positive electrode active material.

FIG. 3(*a*), FIG. 3(*b*) and FIG. 4 are views schematically illustrating steps of manufacturing the electrode 10 of an example of an embodiment. The method for manufacturing the electrode 10 includes: a mixing step illustrated in FIG. 3(*a*); a rolling step illustrated in FIG. 3(*b*); and a laminating step illustrated in FIG. 4. In the mixing step, the coated active material and the PTFE powder are mixed to produce electrode mixture particles 12*a* having a solid-content concentration of substantially 100%. In the rolling step, the electrode mixture particles 12*a* are rolled for forming a sheet to produce an electrode mixture sheet. In the laminating step, the electrode mixture sheet is laminated onto the core to produce the electrode.

The method for manufacturing the electrode 10 is a dry process for manufacturing the electrode 10 by using the electrode mixture 12 having a solid-content concentration of substantially 100%. The dry process is a process in which the active material particles and the binder particles are mixed without a solvent, that is, the active material and the binder are mixed in a state of a solid-content concentration being substantially 100%. The method for manufacturing the electrode 10 according to the present disclosure does not require use of a solvent like a conventional method for manufacturing the electrode 10. The unnecessity of using a solvent intends not only unnecessity as a raw material but also intends to eliminate necessity of a step of drying the solvent, which may also eliminate ventilation equipment and the like involved in the drying step.

In the mixing step, raw materials such as the coated active material and the PTFE powder are mixed with a mixer 20 to produce the electrode mixture particles 12*a*. Using the coated active material produced by mixing the active material and the conductive agent may shorten a time of the mixing step to yield an electrode mixture in which the coated active material and the PTFE powder are uniformly dispersed. If the mixing treatment is performed for a long time, the conductive agent is incorporated into the binder to cause the coverage of the conductive agent on the active material surface to less than 10%. Using the coated active material may improve the dispersity of the constituent materials to reduce the mixture resistance. In addition, the shortened time of the mixing treatment may inhibit cracking of the active material during the mixing treatment. Note that the active material included in the electrode can include cracked particles during the mixing treatment and cracked particles during the rolling step, described later.

As the mixer 20 conventionally known mechanically staling mixers may be used, for example. Specific examples of a preferable mixer 20 include a cutter mill, a pin mill, a bead mill, a fine-particle composer (an apparatus generating a shear force between: a rotor having a special shape and rotating at a high speed in a tank and a collision plate), a granulator, and a kneader such as a twin-screw extrusion pleader and a planetary mixer. These mixers may apply a mechanical shear force. A cutter mill, a fine-particle composer, a granulator, and a twin-screw extrusion kneader are preferable. This may mix the raw materials and further fibrillate the PTFE powder. The treatment time of the mixing step (time for applying the shear force to the materials) is preferably within several minutes, and may be 0.5 minutes to 4 minutes, for example. An excessively long treatment time increases an amount of the conductive agent to be incorporated into the PTFE powder. In this case, the battery characteristics are adversely affected such that the conductivity of the electrode mixture sheet considerably decreases to increase the resistance. In addition, a longer treatment time more proceeds the PTFE fibrillation, and thereby excessive fibrillation decreases the rupture strength of the sheet. Since the PTFE powder contains predetermined amounts of the previously fibrillated fibrous particle A and/or fibrous particle B, a treatment time of 0.5 minutes or longer allows the PTFE powder to adhere to the particle surface of the active material to intertwine with the active material.

As illustrated in FIG. 3(*b*), in the rolling step, the electrode mixture particles 12*a* is rolled by using two rollers 22 to form a sheet. The two rollers 22 are disposed with a predetermined gap, and rotate in the same direction. The electrode mixture particles 12*a* are fed into the gap between the two rollers 22 to be compressed with the two rollers 22, and stretched into a sheet. The two roller 22 have the same roller diameter, for example. The obtained electrode mixture sheet 12*b* may be passed between the gap between the two rollers 22 a plurality of times, and may be stretched by using another roller having a different roller diameter, peripheral speed, gap, and the like one or more times. The roller may be heated to heat-press the electrode mixture particles 12*a*.

A thickness of the electrode mixture sheet 12*b* may be regulated with, for example, the gap between the two rollers 22, the peripheral speed, the number of the stretching treatment, and the like. In the rolling step, the electrode mixture particles 12*a* are preferably formed into a sheet by using two rollers 22 having peripheral speeds differing by a factor of two or more. Setting the peripheral speeds of the two rollers 22 to be different facilitates the thinning of the electrode mixture sheet 12*b* to improve the productivity, for example.

Then, as illustrated in FIG. 4, in the laminating step, the electrode mixture sheet 12*b* is laminated onto the core 11 to obtain the positive electrode 10 in which a mixture layer composed of the electrode mixture 12 is provided on the surface of the core 11. Although FIG. 4 illustrates a state where the electrode mixture 12 is joined to only one surface of the core 11, the electrode mixture 12 is preferably joined to both the surfaces of the core 11. The two electrode mixtures 12 may be joined to both the surfaces of the core 11 simultaneously. It is also acceptable that one sheet is joined to one surface of the core 11 and then another sheet is joined to the other surface.

In the laminating step, the electrode mixture sheet 12*b* is laminated onto the surface of the core 11 by using two rollers 24. The two rollers 24 have the same roller diameter, disposed with a predetermined gap, and rotate in the same direction at the same peripheral speed, for example. The two rollers 24 are preferably heated to a predetermined temperature to apply a predetermined pressure.

EXAMPLES

Hereinafter, the present disclosure will be further described with Examples, but the present disclosure is not limited to these Examples.

Example

[Coating Treatment of Conductive Agent to Surface of Positive Electrode Active Material]

By using NOB300? Nobilta®, manufactured by HOSOKAWA MICRON CORPORATION, 1000 g of a lithium-transition metal composite oxide and 10 g of acetylene black (AB) were mixed with the Nobilta crusher for 5 minutes to produce a carbon-coated positive electrode active material. This carbon-coated positive electrode active material had a coverage of carbon (conductive agent) of 51.5%.
[Production of Positive Electrode Mixture Particles (Mixing Stop)]

Used as the PTFE powder was a powder including fibrous particles having an aspect ratio of 1.5 or more at a proportion of 33% based on all the particles, and having an average major axis size of fibrous particles of 8.3 μm. The above carbon-coated positive electrode active material and the PTFE powder were fed into a mixer (Wonder Crusher, manufactured by OSAKA CHEMICAL Co., Ltd.) at a mass ratio of 101:4, and mix-treated at a room temperature with a number of rotation of "Speed level 5" for 5 minutes. Note that a number of rotation of Wonder Crusher is maximum 28000 rpm with "Speed level 10". This mixing treatment yielded positive electrode mixture particles in which the carbon-coated positive electrode active material and the PTFE powder were uniformly dispersed. The obtained positive electrode mixture had a solid-content concentration of 100%.
[Production of Positive Electrode Mixture Sheet (Rolling Step)]

The obtained positive electrode mixture particles were rolled by passing between two rollers to produce a positive electrode mixture sheet. The two rollers were set to have a peripheral speed ratio of 1:3 to regulate a thickness of the positive electrode mixture sheet to approximately 100 μm.
[Production of Positive Electrode (Laminating Step)]

The positive electrode mixture sheet produced in Example 1-1 was disposed a surface of a positive electrode core, and a laminate of the positive electrode mixture sheet and the positive electrode core was pressed by using two rollers (linear pressure: 1.0 t/cm) to obtain a positive electrode. As the core, aluminum alloy foil was used. The mixture resistance was 18.2 Ωcm.
[Production of Non-Aqueous Electrolyte]

Into a non-aqueous solvent in which ethylene carbonate (EC) and ethyl methyl carbonate (EMC were mixed at a volume ratio of 1:3, LiPF$_6$ as an electrolyte salt was dissolved at 1.0 mol/L to prepare a non-aqueous electrolyte liquid being a liquidous non-aqueous electrolyte.
[Production of Test Cell]

An aluminum lead was attached to the above positive electrode, and a nickel Lead was attached to a lithium metal foil, used as a negative electrode. The positive electrode and the negative electrode were spirally wound with a separator made of a polyolefin interposed therebetween, and then press-formed in the radial direction to produce a flat, wound electrode assembly. This electrode assembly was housed in an exterior composed of an aluminum laminated sheet, the above non-aqueous electrolyte was injected thereinto, and then an opening of the exterior was sealed to obtain a test cell for evaluation.
[Evaluation of Initial Discharge Capacity]

Under a temperature environment at 25° C., the above test cell was charged at a constant current of 0.5 C. until a cell voltage reached 4.2 V, then charged at a constant voltage of 4.2 V until a current value reached 1/50 C, and thereafter discharged at a constant current of 0.5 C. until the cell voltage reached 2.5 V. A discharge capacity at this time was specified as an initial discharge capacity.

Comparative Example

A test cell was produced and evaluated in the same manner as in Example except that the coating treatment of the conductive agent onto the surface of the positive electrode active material was not performed; and in the production of the positive electrode mixture particles (mixing step), the lithium-transition metal composite oxide, AB, and the PTFE powder were fed into the mixer at a mass ratio of 100:1:4. A coverage of carbon (conductive agent) on the surface of the positive electrode active material before the mixing step was 0%. The mixture resistance of the produced positive electrode of the positive electrode mixture particles was 55.1 Ωcm.

Table 1 shows the initial discharge capacity of Example and Comparative Example. The discharge capacity of Comparative Example is a value relative to the discharge capacity of Example being 100. Table 1 also shows: presence/absence of the coating treatment of the conductive agent onto the surface of the positive electrode active material; values of the mixture resistance; and contents (a, b, and c) of the binder in the first region, the second region, and the third region in the positive electrode mixture. In Comparative Example, the contents (a, b, and c) of the binder in the first region, the second region, and the third region were not measured.

TABLE 1

| | Coating treatment | Mixture resistance [Ω cm] | Distribution of binder in PTFE | | | Initial discharge capacity |
| | | | a | b | c | |
|---|---|---|---|---|---|---|
| Example | Presence | 18.2 | 34 | 35 | 31 | 100 |
| Comparative Example | Absence | 55.1 | 32 | 35 | 33 | 94 |

As shown in Table 1, the test cell of Example had larger initial discharge capacity than the test cell of Comparative Example. It is presumed that the positive electrode of Example has a higher coverage of the conductive agent on the surface of the positive electrode active material than the positive electrode of the Comparative Example, and thereby the mixture resistance is lower than the positive electrode of Comparative Example to increase the initial discharge capacity.

REFERENCE SIGNS LIST

10 Electrode
11 Core
12 Electrode mixture
12a Electrode mixture particles
12b Electrode mixture sheet
15 Mechano-fusion reactor
16 Chamber
17 Blade
20 Mixer
22, 24 Roller

The invention claimed is:

1. An electrode, comprising an electrode mixture laminated onto a surface of a core, the electrode mixture including: a coated active material in which a conductive agent is adhered onto a surface of an active material; and a PTFE powder,
   wherein a coverage of the conductive agent on a surface of the coated active material is 10% to 60%,
   the active material comprises particles having a median diameter (D50) on a volumetric basis of 3 μm to 30 μm,
   a particle diameter of the conductive agent is 0.01 μm to 0.1 μm, a mixture resistance of the electrode mixture is 20 Ωcm or less, and when the electrode mixture is trisected in a thickness direction to specify a first region, a second region, and a third region from a side of the core, a content (a) of the PTFE powder in the first region, a content (b) of the PTFE powder in the second region, and a content (c) of the PTFE powder in the third region satisfy −10%≤(c−a)/(a+b+c)≤10%.

2. The electrode according to claim 1, wherein the coated active material has roughness on the surface, and the conductive agent adheres by entering a concavity of the roughness.

3. The electrode according to claim 1, wherein the active material is a positive electrode active material.

4. The electrode according to claim 1, wherein the PTFE powder includes fibrous particles having an aspect ratio of 1.5 or more at a proportion of 20% to 60% based on all the particles, and an average major axis size of the fibrous particles is 1 μm to 20 μm.

5. The electrode according to claim 1, wherein the PTFE powder includes fibrous particles having an aspect ratio of 5 or more at a proportion of 60% or more based on all the particles, and an average minor axis size of the fibrous particles is 1 μm to 20 μm.

6. A method for manufacturing an electrode, including:

a mixing step of mixing a coated active material in which a conductive agent is adhered onto a surface of an active material and a PTFE powder to produce electrode mixture particles having a solid-content concentration of substantially 100%;

a rolling step of rolling the electrode mixture particles for forming a sheet to produce an electrode mixture sheet; and a laminating step of laminating the electrode mixture sheet onto a core to produce an electrode, wherein the active material comprises particles having a median diameter (D50) on a volumetric basis of 3 μm to 30 μm, and a particle diameter of the conductive agent is 0.01 μm to 0.1 μm.

7. The method for manufacturing an electrode according to claim 6, wherein the coated active material is obtained by dry-mixing the active material and the conductive agent.

8. The electrode according to claim 1, wherein the conductive agent includes one or more selected from the group consisting of carbon black (CB), acetylene black (AB), Ketjenblack, carbon nanotube (CNT), and graphite.

9. The electrode according to claim 1, wherein the conductive agent includes acetylene black (AB).

10. The method for manufacturing an electrode according to claim 6, wherein the conductive agent includes one or more selected from the group consisting of carbon black (CB), acetylene black (AB), Ketjenblack, carbon nanotube (CNT), and graphite.

11. The method for manufacturing an electrode according to claim 6, wherein the conductive agent includes acetylene black (AB).

* * * * *